United States Patent
Thomas et al.

(10) Patent No.: US 9,276,477 B2
(45) Date of Patent: Mar. 1, 2016

(54) DC-DC CONVERTER WITH ENHANCED AUTOMATIC SWITCHING BETWEEN CCM AND DCM OPERATING MODES

(71) Applicant: STMicroelectronics International N.V., Amsterdam (NL)

(72) Inventors: Matthieu Thomas, Prague (CZ); Bohumil Janik, Cesky Brod (CZ); Ondrej Tlaskal, Kamenice (CZ)

(73) Assignee: STMicroelectronics International N.V., Amsterdam (NL)

( * ) Notice: Subject to any disclaimer, the term of this patent is extended or adjusted under 35 U.S.C. 154(b) by 166 days.

(21) Appl. No.: 14/085,914

(22) Filed: Nov. 21, 2013

(65) Prior Publication Data

US 2015/0137776 A1    May 21, 2015

(51) Int. Cl.
*H02M 3/157* (2006.01)
*H02M 3/158* (2006.01)
*H02M 1/00* (2007.01)

(52) U.S. Cl.
CPC .... *H02M 3/1588* (2013.01); *H02M 2001/0009* (2013.01); *H02M 2001/0025* (2013.01); *H02M 2001/0032* (2013.01)

(58) Field of Classification Search
CPC ............ H02M 3/156; H02M 2003/1566; H02M 3/157; H02M 3/158; H02M 3/1588; H02M 2001/0012; Y02B 70/1466
USPC .................. 323/282, 283, 284, 285
See application file for complete search history.

(56) References Cited

U.S. PATENT DOCUMENTS

| | | | |
|---|---|---|---|
| 6,307,356 B1 * | 10/2001 | Dwelley | 323/282 |
| 8,076,917 B2 | 12/2011 | Feng et al. | |
| 8,330,439 B2 | 12/2012 | Wu | |
| 2007/0085520 A1 * | 4/2007 | Ho | 323/282 |
| 2010/0201336 A1 | 8/2010 | Chen et al. | |
| 2010/0301822 A1 | 12/2010 | Chen et al. | |
| 2010/0320986 A1 | 12/2010 | Collins | |
| 2012/0249106 A1 | 10/2012 | Wu | |

OTHER PUBLICATIONS

Luo et al. "A Low-Ripple Fast-Response CMOS Integrated Switching Buck Converter with Dual-Mode Pulse-Train/PWM Control." IEEE; Power Electronics Specialists Conference 2008; PESC 2008; pp. 3432-3436.

(Continued)

*Primary Examiner* — Gary L Laxton
(74) *Attorney, Agent, or Firm* — Gardere Wynne Sewell LLP

(57) ABSTRACT

A DC-DC converter transitions between continuous conduction mode (CCM) and discontinuous conduction mode (DCM) without causing any overshoot or undershoot deviation output voltage. The DC-DC converter operates in a PWM mode in CCM. During DCM, it skips PWM pulses when a sustained negative current is detected in an output inductor. The current sensing is achieved by sampling and integrating a voltage, the sign of which is inverse to current direction. The sample and hold and integrator circuits are small, simple, and scale to high frequencies. The pulse skipping circuit automatically adjusts the duty cycle of power pulses to force a zero inductor current at the end of each pulse.

19 Claims, 12 Drawing Sheets

(56) References Cited

OTHER PUBLICATIONS

Cliquennois et al. "A 65-nm, 1-A Buck Converter with Multi-Function SAR-ADC-Based CCM/PSK Digital Control Loop." IEEE Journal of Solid-State Circuits, vol. 47, No. 7, Jul. 2012, pp. 1546-1556.

Morra et al. "PFM Mode Buck Converter: A Mathematical Model to Calculate the Maximun Switching Frequency." Electronics, Circuits and Systems, 2008. 15th IEEE International Conference, ICECS 2008, pp. 926-929.

* cited by examiner

_US 9,276,477 B2_

DC-DC CONVERTER WITH ENHANCED AUTOMATIC SWITCHING BETWEEN CCM AND DCM OPERATING MODES

FIELD OF INVENTION

The present invention relates generally to DC-DC power converters, and in particular to a DC-DC converter and control circuit that automatically switches between Continuous Conduction Mode (CCM) and Discontinuous Conduction Mode (DCM) in a manner that avoids output transients.

BACKGROUND

Mobile electronics devices are a ubiquitous part of modern life. Medical devices (e.g., pacemakers, hearing aids), telecommunications devices (e.g., pagers, cellular telephones), computing devices (e.g., laptop and tablet computers), navigation devices (e.g., satellite navigation receivers), entertainment devices (e.g., digital music players, still and video cameras), and innumerable portable electronic devices used in a wide variety of jobs (e.g., portable point-of-sale devices), to name but a few, all run on battery power. Many such devices include electronic circuits that require power to be supplied at different voltages. Additionally, the Direct Current (DC) voltage supplied by a battery varies over time, as the battery slowly loses power over its lifetime, or between recharges. A DC-DC converter is an electrical circuit typically employed to convert an unpredictable battery voltage to one or more continuous, regulated, predetermined DC voltage levels, which provide power to electronic circuits. Numerous types of DC-DC converters are known in the art. The term "buck" converter has been used to describe a DC-DC converter that outputs a lower voltage than the DC source (such as a battery); a "boost" converter is one that outputs a higher voltage than its DC input.

One important class of buck DC-DC converters, which operates with a relatively high efficiency and thus enhances battery life, is a form of switched mode power supply (SMPS). A SMPS buck DC-DC converter rapidly switches power from a DC source, such as a battery, to an energy storage element such as an inductor or capacitor, and then outputs the power at a predetermined voltage level. The output voltage level may be maintained by timing the switches transferring the power, based on a feedback control system FIG. 1 depicts a simplified block diagram of a switching buck DC-DC converter 10. A power stage 12 comprises two series-connected transistors M0 and M1 implementing electronic switches, alternately connecting the node LX to a DC source power level (e.g., a battery voltage $V_{BAT}$) and a lower voltage, such as ground. An inductor L stores energy from the source in a magnetic field. The amount of power output by the inductor to a load is controlled by the timing of the switches M0 and M1. An output capacitor C may be added to store charge and smooth the output voltage. A control circuit 30 regulates the switching of the transistors, in response to a feedback signal monitoring the output voltage or current A SMPS may be operated in a different control modes, which may be dictated by operating conditions such as the power demanded by the load. Various DC-DC SMPS operating modes, each appropriate for different circumstances, are known in the art. However, switching between operating modes as conditions change, remains a challenge in DC-DC converter controller design. Prior art multi-mode DC-DC converters experience undesirable transients, such as overshoot, undershoot, or increases in ripple current, when switching between operating modes.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a DC-DC converter transitions between continuous conduction mode (CCM) and discontinuous conduction mode (DCM) without causing any overshoot or undershoot deviation output voltage. The DC-DC converter operates in a Forced Pulse Width Modulation (FPWM) mode in CCM. During DCM, it skips PWM pulses when a sustained negative current is detected in an output inductor, thus operating in a Pulse Skipping Mode (PSK). The current sensing is achieved by sampling and integrating a voltage, the sign of which is inverse to current direction. The sample and hold and integrator circuits are small, simple, and scale to high frequencies. The pulse skipping circuit automatically adjusts the duty cycle of power pulses to force a zero inductor current at the end of each pulse.

One embodiment relates to a DC-DC converter operative to receive a source DC voltage and provide an output DC voltage to a load. The DC-DC converter includes a power stage comprising first and second transistors connected in series between a first source voltage and a second source voltage level. The DC-DC converter also includes an inductor connected between the node connecting the first and second transistors and a load and operative to provide an inductor current from the DC-DC converter to the load. The DC-DC converter further includes control logic operative to generate control pulses to the power stage operative to cause the transistors to successively and alternately connect the inductor to the first and second source voltage levels, wherein the controller is further operative to generate a continuous stream of control pulses in a continuous conduction mode and to selectively generate control pulses, with the transistors disconnecting the inductor from both the first and second source voltage levels between control pulses, in a discontinuous conduction mode. The control logic is operative to switch between continuous and discontinuous conduction modes without causing an overshoot or undershoot deviation in the output voltage by skipping the generation of control pulses in response to detecting reversal of the current in the inductor.

Another embodiment relates to a method of operating a DC-DC converter comprising a power stage including first and second transistors connected in series between a first source voltage level and a second source voltage level, and an inductor connected between the node connecting the first and second transistors and a load. The voltage output to the load is compared to a reference voltage to generate a Verror signal. A periodic signal defining a period, the duty cycle of which controls the relative conduction durations of the first and second transistors in a period if they are rendered conductive for the period, is generated. A voltage, the sign of which is the inverse of the direction of a minimum current through the inductor, is sampled. The sampled voltage is integrated to generate a Zerror signal. The first and then second transistors are successively, alternately rendered conductive for a period according to the duty cycle of the periodic signal, if Verror>Zerror at the beginning of the period. Both the first and second transistors are rendered non-conductive for the duration of a period if Zerror>Verror at the beginning of the period.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
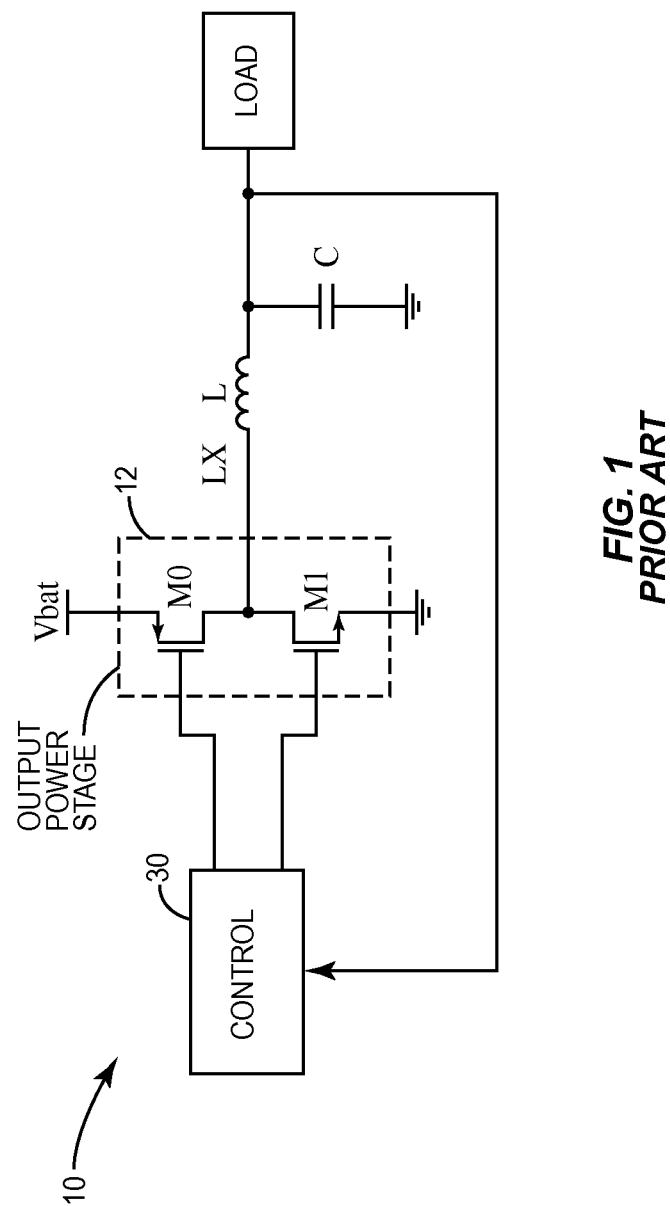
FIG. 1 is a functional schematic diagram of a prior art DC-DC converter.
Figure 2:
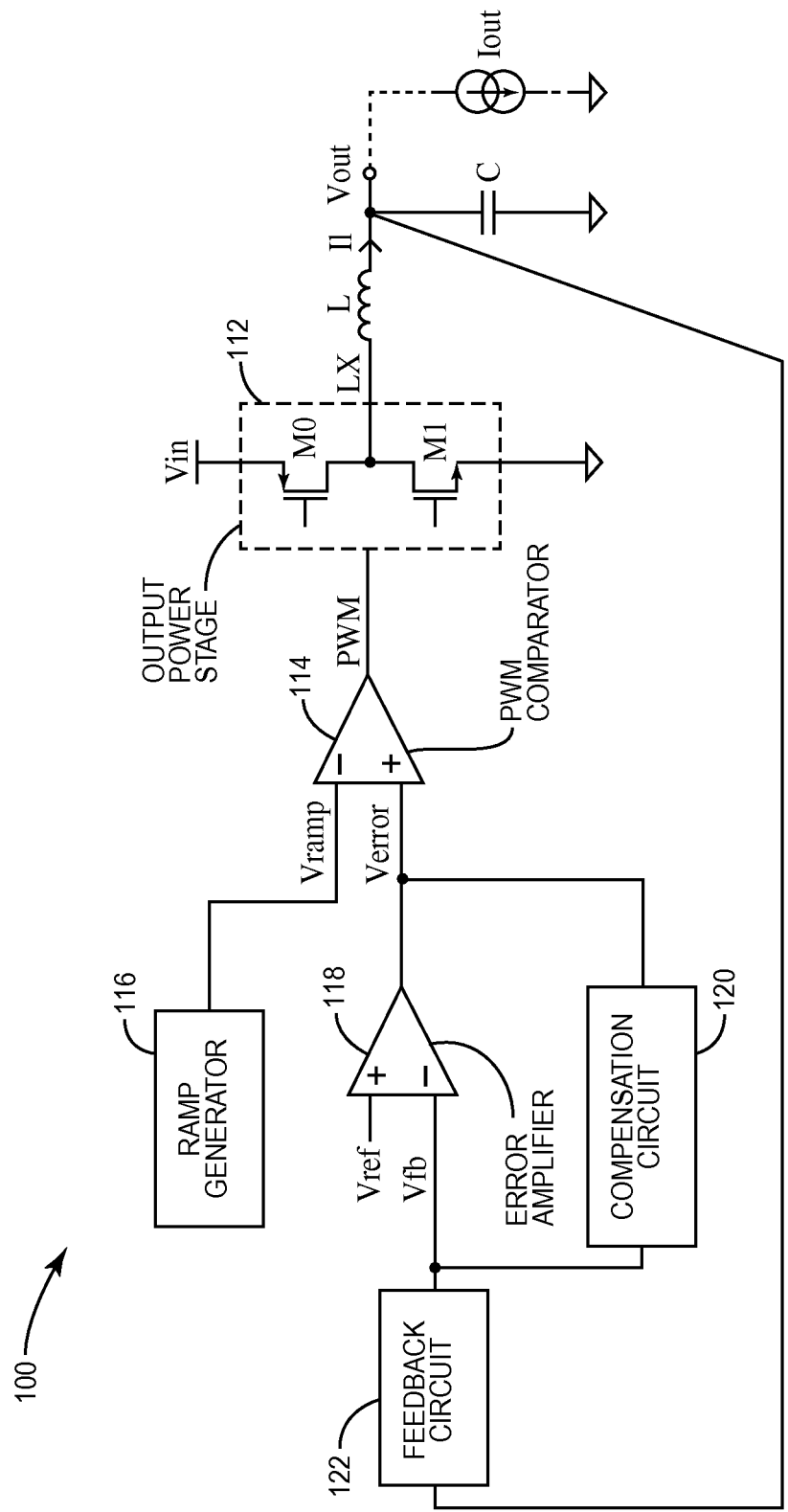
FIG. 2 is a functional schematic diagram of a Pulse Width Modulated DC-DC converter.
Figure 3:
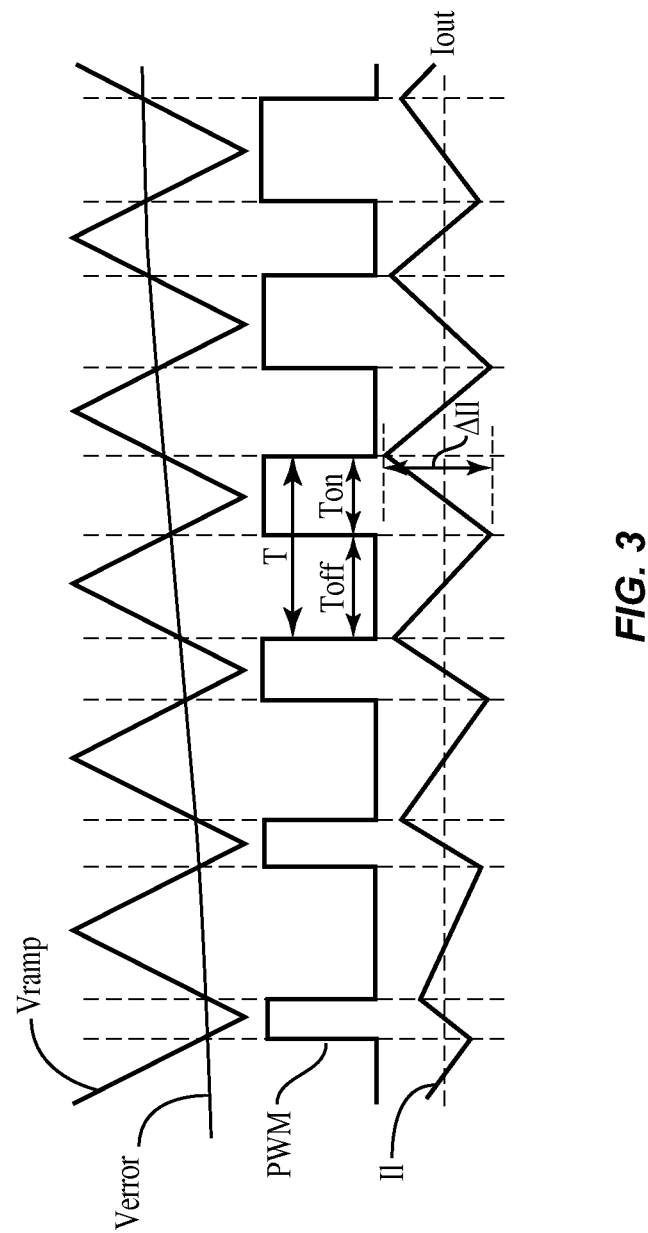
FIG. 3 is a signal diagram of the operation of the DC-DC converter of FIG. 2.

FIG. 2 depicts the structure, and FIG. 3 the operation, of a Forced Pulse Width Modulation (FPWM), Continuous Conduction Mode (CCM), buck DC-DC converter 100. This type of DC-DC converter 100 comprises a power stage 112 featuring two switches M0 and M1 which can connect the node LX either to ground (M0 Off, M1 On) when the PWM logic signal is a logical 0, or to the supply voltage Vin (M0 On, M1 Off) when the PWM=1. The switches M0, M1 are typically MOS transistors, which are characterized by fast switching times and low on-resistance.

The periodic PWM logic signal is generated by a comparator 114 comparing an error signal Verror to a ramp signal Vramp, which is a periodic signal having a slope, such as sawtooth or a triangular waveform. The ramp signal Vramp is generated by the ramp generator 116 at a fixed frequency, ensuring that the power stage 112 also switches at fixed frequency.

The error signal Verror is generated by an error amplifier 118 with a compensation circuit 120 connecting its output with the negative input. The error amplifier 118 senses the output voltage (or the output voltage scaled through a feedback circuit 122) and compares it with an input reference voltage level Vref. The error amplifier 118 ensures that Vref and Vfb are very close. The coupled feedback circuit 122 and compensation circuit 120 implement an RC network ensuring the stability of the loop Verror-PWM-Vout-Vfb. This network may implement a Proportional-Integral-Derivative (PID) type regulation, as known in the art.

In operation, as depicted in FIG. 3, if the feedback voltage Vfb decreases, the difference Vref−Vfb increases, and so does Verror. The duty cycle of the switching signal PWM is then increased due to the slope of Vramp, which results in an increase in the average value of the output voltage Vout. This brings Vfb closer to Vref. This process will continue until Vref and Vfb are close enough so that their difference causes Verror to stabilize.

The general definition of a duty cycle is Duty=Ton/T. The first order relationship between the switching duty cycle, Vin, and Vout in a buck switching mode power supply is Duty=Vout/Vin. The value of the PWM signal duty cycle as a function of Verror and the peak-to-peak value of Vramp amplitude, Vramp-pp, is Duty=Verror/Vramp-pp (although this is valid only when the ramp minimum=0V).

In this design, if the load sinks a DC current Iout less than half the inductor ripple current ΔIl, then the inductor current Il will reverse during part of the period, leading to a degradation of the overall efficiency.

Figure 4:
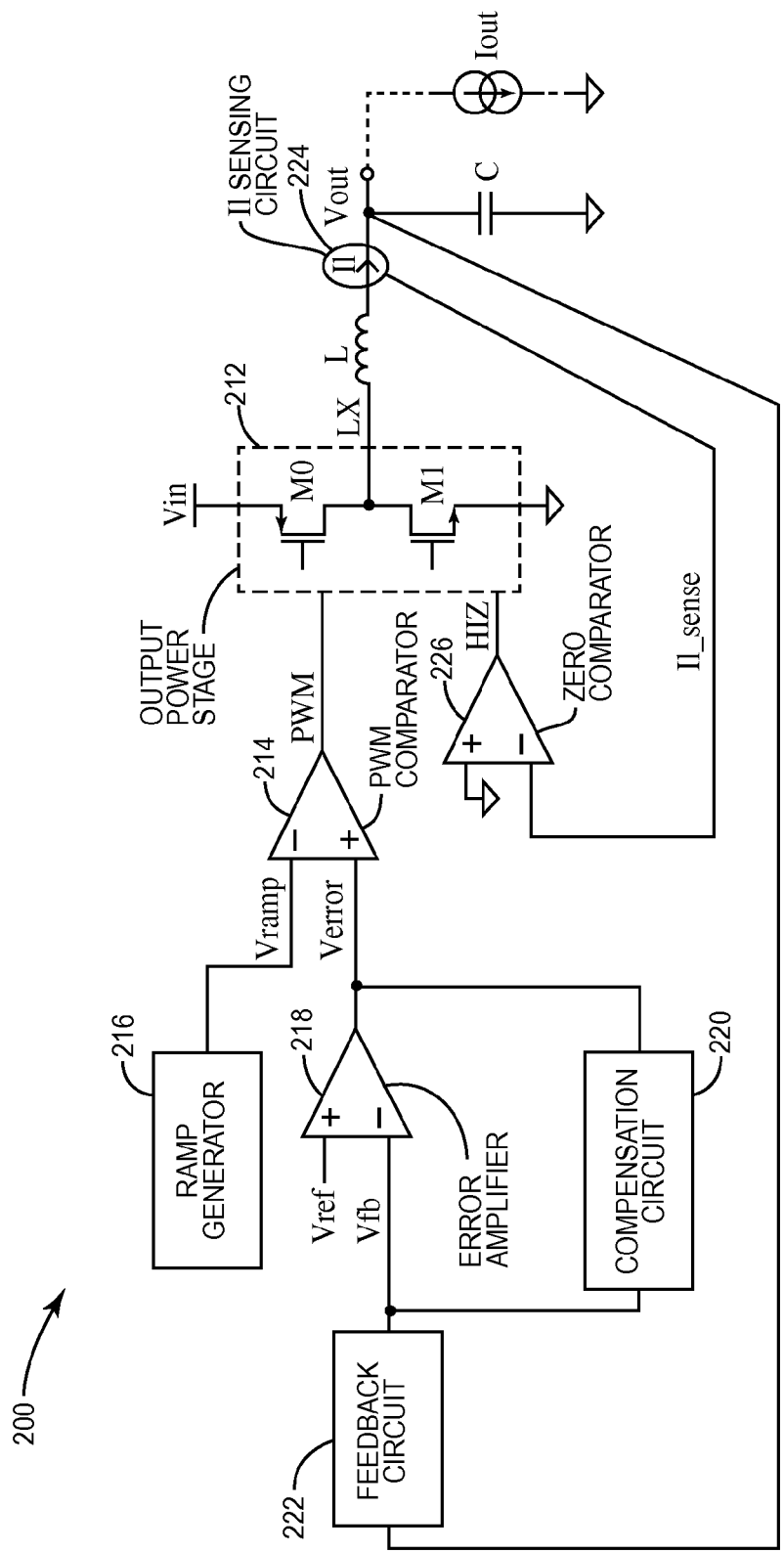
FIG. 4 is a functional schematic diagram of a DC-DC converter with a Discontinuous Conduction Mode of operation.
Figure 5:
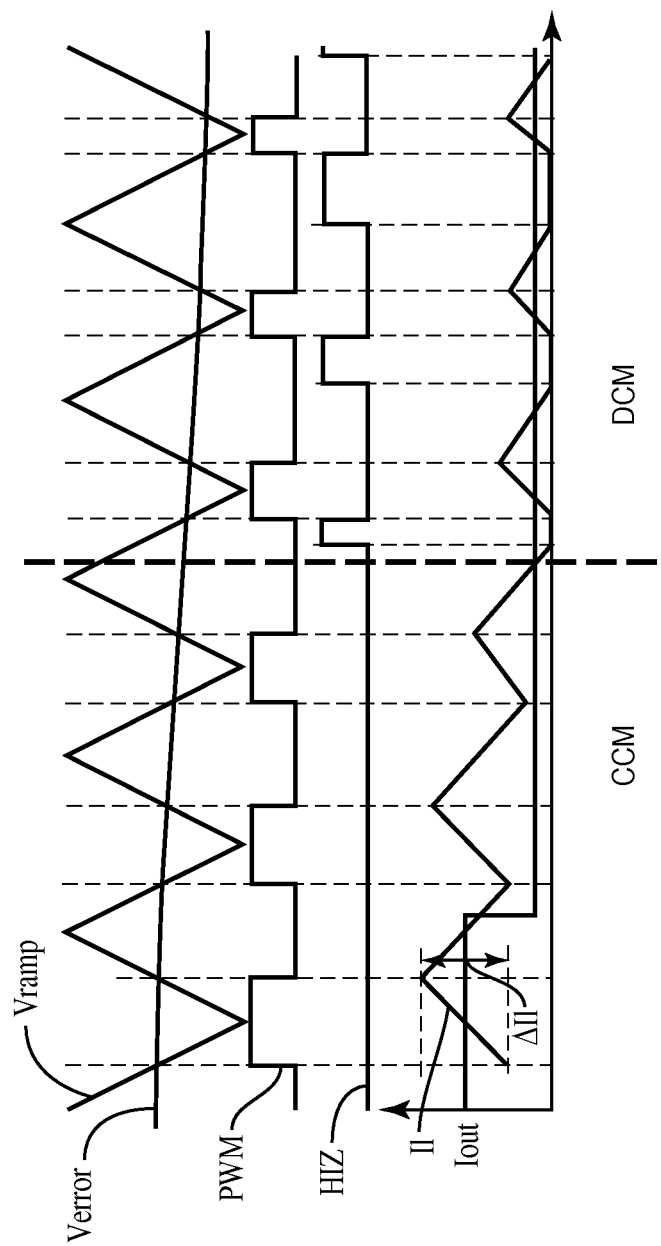
FIG. 5 is a signal diagram of the operation of the DC-DC converter of FIG. 4.

FIGS. 4 and 5 show the structure and operation of a FPWM buck DC-DC converter 200 in Discontinuous Conduction Mode (DCM). This type of DC-DC converter 200 is identical to the FPWM/CCM DC-DC converter 100 of FIG. 2, with two additional functions. The first function is the Il sensing circuit 224. This circuit 224 senses the current in the inductor and converts this current information to a voltage, called Il_sense. The second added function is a zero comparator 226 that compares the Il_sense signal to ground, generating a logical signal denoted HIZ. When Il_sense is above ground, HIZ is a logical 0; otherwise it is a logical 1. If HIZ=0, the operation of the converter 200 is as a FPWM/CCM DC-DC converter 100, as described above. When HIZ=1, the power stage 212 is placed in High Impedance mode, with both M0 and M1 turned off.

In CCM mode, the ripple current in the inductor, denoted ΔIl, is to the first order a function of the output voltage Vout, input voltage Vin, switching frequency Fs and inductance value L as follows:

$$\Delta Il = \frac{Vout * \left(1 - \frac{Vout}{Vin}\right)}{Fs * L}$$

When the DC output current Iout is above $\Delta Il/2$, the DC-DC converter 200 is operating in CCM as described previously. When the average output current falls below $\Delta Il/2$ then the average inductor current Il diminishes as well. When Il crosses 0A during M1 conduction (PWM=0), the zero comparator 226 triggers and HIZ changes to a logical 1, placing the power stage 212 in high impedance condition. This marks the beginning of DCM mode of operation. The power stage 212 remains in high impedance until PWM=1. HIZ is reset to 0 when PWM=1. When the load current increases, the inductor current Il follows in order to maintain Vout level, and the DC-DC converter 200 exits the DCM mode.

One limitation of operating in DCM mode is that the dynamic behavior of the converter from PWM to Vout changes dramatically between CCM and DCM modes. In CCM, the inductor L ensures an integration function in the loop. That is, each power stage 212 conduction cycle starts where the previous cycle stopped, and the integration is a gain. In the DCM mode, on the other hand, no integration function is present, because each cycle starts from Il=0 A. Due to these differences in integration, the DC-DC converter 200 exhibits dramatically different dynamic behavior in CCM and DCM modes. It is very difficult to design a controller that has good dynamic performances in both modes. A PWM controller primarily designed for CCM mode will display large overshoot or undershoot of Vout when entering or leaving the DCM operating mode.

An additional limitation of DCM is that when the load current is small compared to $\Delta Il/2$, the conduction time of M0/M1 decreases (as depicted in FIG. 5, the PWM signal duty cycle decreases in DCM). The energy provided to the load relates to the area under the Il curve, which decreases with the smaller conduction times. However, the energy needed to switch M0 and M1 on or off remains constant because the transistors are switched every clock cycle. Thus the efficiency of the DC-DC converter 200 (that is, the ratio of output power to the power consumed by the converter 200) is degraded for small loads.

Figure 6:
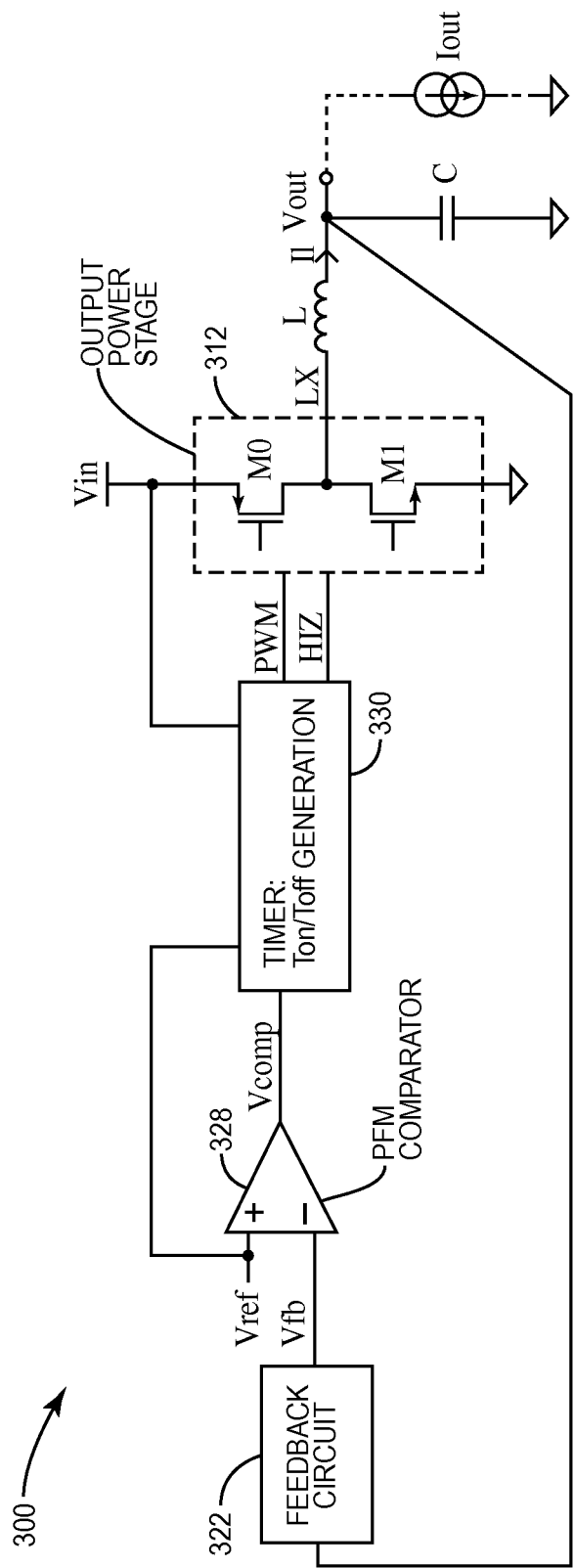
FIG. 6 is a functional schematic diagram of a Pulse Frequency Modulation DC-DC converter.
Figure 7:
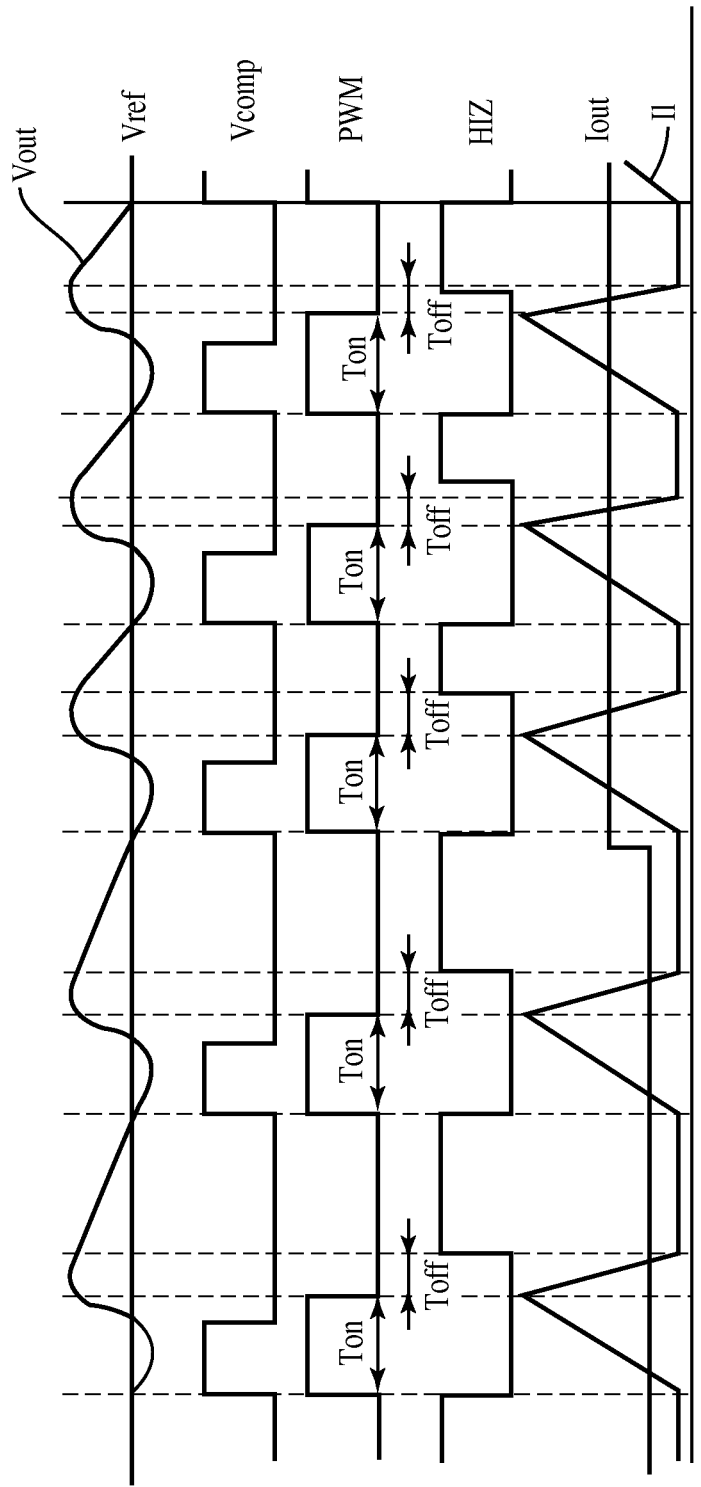
FIG. 7 is a signal diagram of the operation of the DC-DC converter of FIG. 6.

Accordingly, a known approach to low power operation of a buck switching power converter is to keep the size of the power stage pulses constant, but change their frequency. FIG. 6 depicts a Pulse Frequency Modulation (PFM) buck DC-DC converter 300, and FIG. 7 depicts its relevant waveforms. One example of PFM converter is given in the paper by A. Morra, M. Piselli, and A. Gola, "PFM mode buck converter: A mathematical model to calculate the maximum switching frequency," published in the journal of the 15*th IEEE International Conference on Electronics, Circuits and Systems*, pp. 926-929 (2008), the disclosure of which is incorporated herein by reference in its entirety.

The PFM DC-DC converter 300, similarly to the DC-DC converters 100, 200 of FIGS. 2 and 4, comprises a power stage 312 and a feedback circuit 322. It also features a PFM comparator 328 that compares the feedback voltage Vfb with a reference voltage level Vref. The output of the comparator 328, the logical signal Vcomp, is an input to a timer block 330, the function of which is to control the M0 and M1 conduction times, via timing signals Ton and Toff, respectively. The generation of Ton and Toff is based on Vref, Vin and a time base Tbase, and the Ton and Toff timings are used to generate the PWM and HIZ signals controlling the power stage 312. These timings are computed using the following equations:

$$Ton = \frac{Vref\_scaled}{Vin} * Tbase \text{ and}$$

$$Toff = \left(1 - \frac{Vref\_scaled}{Vin}\right) * Tbase \text{ where Vref\_scaled is the referenc}$$

voltage Vref divided by the gain of the feedback circuit 322.

When Vfb rises above Vref, Vcomp=0 and the power stage 312 goes into high impedance (HIZ=1). As soon as Vfb falls below Vref, Vcomp switches to a logical 1, which triggers the timer 330. The timer 330 first switches M0 on and M1 off by setting PWM=1 and HIZ=0. After Ton time, M0 is turned off and M1 on by setting PWM=0. After Toff time, the power stage 312 is either placed in high impedance, if Vcomp fell to 0 in the meantime, or generates a new pulse if Vcomp=1. The Ton and Toff times are generated, based on the slope of Il computed from Vin and Vout, such that at the end of the cycle Ton+Toff, the current Il in the inductor L is back to 0. The length of a pulse is fixed and equal to Tbase.

Although the PFM mode of operation works well for low power demands, the maximum current that can be supplied in this mode is $\Delta Il/2$. Accordingly, a mechanism is needed to change the DC-DC converter 300 operating mode to FPWM/CCM, for example, if a current higher than $\Delta Il/2$ is required. Switching between a low power mode such as PFM and a high power mode such as FPWM/CCM mode is problematic.

U.S. Pat. No. 8,330,439 describes a DC-DC converter in which the transition between PFM and PWM modes is made based on information obtained by comparing the output voltage and the reference voltage minus a delta. By construction, this system induces an undershoot in output voltage during the transition from PFM to PWM mode.

U.S. Pat. No. 8,076,917 describes a system with improved transitions between FPWM and PSK modes. This is done by generating a signal close to the error level in FPWM mode, thus limiting the variation of the error when switching between modes. However, the patent does not disclose on which information the decision to execute a mode switch is based, or how the length of a pulse in PSK mode is determined. Indeed, the circuits depicted in FIGS. 4-6 of this patent are non-functional in PSK mode.

F. Luo and D. Ma, in a paper "A Low-Ripple Fast-Response CMOS Integrated Switching Buck Converter with Dual-Mode Pulse-Train/PWM Control," published in the 2008 *Power Electronics Specialists Conference*, pp. 3432-3436 (2008), the disclosure of which is incorporated herein by reference in its entirety, propose the use of a Power Train (PT) control for low power modes. This method is based on instantaneous measurement of the current in the inductor for determining the size of the pulse—an approach that will not scale up to high frequencies. This technique also compares the output voltage with different thresholds, which induces a larger output voltage ripple.

Known approaches to multi-mode DC-DC converters thus suffer from a large overshoot/undershoot or increased ripple when going from a PWM mode to a low power mode (PSK, PFM, PT); require high speed circuits to sense the instantaneous value of the output current; and/or suffer from undetermined pulse sizing methodology in the low power modes. To effectively and efficiently switch between modes, control circuits for a DC-DC converter must determine when to enter a low power mode, how to size switching control pulses in the low power mode, and how to return to a FPWM mode.

Figure 8:
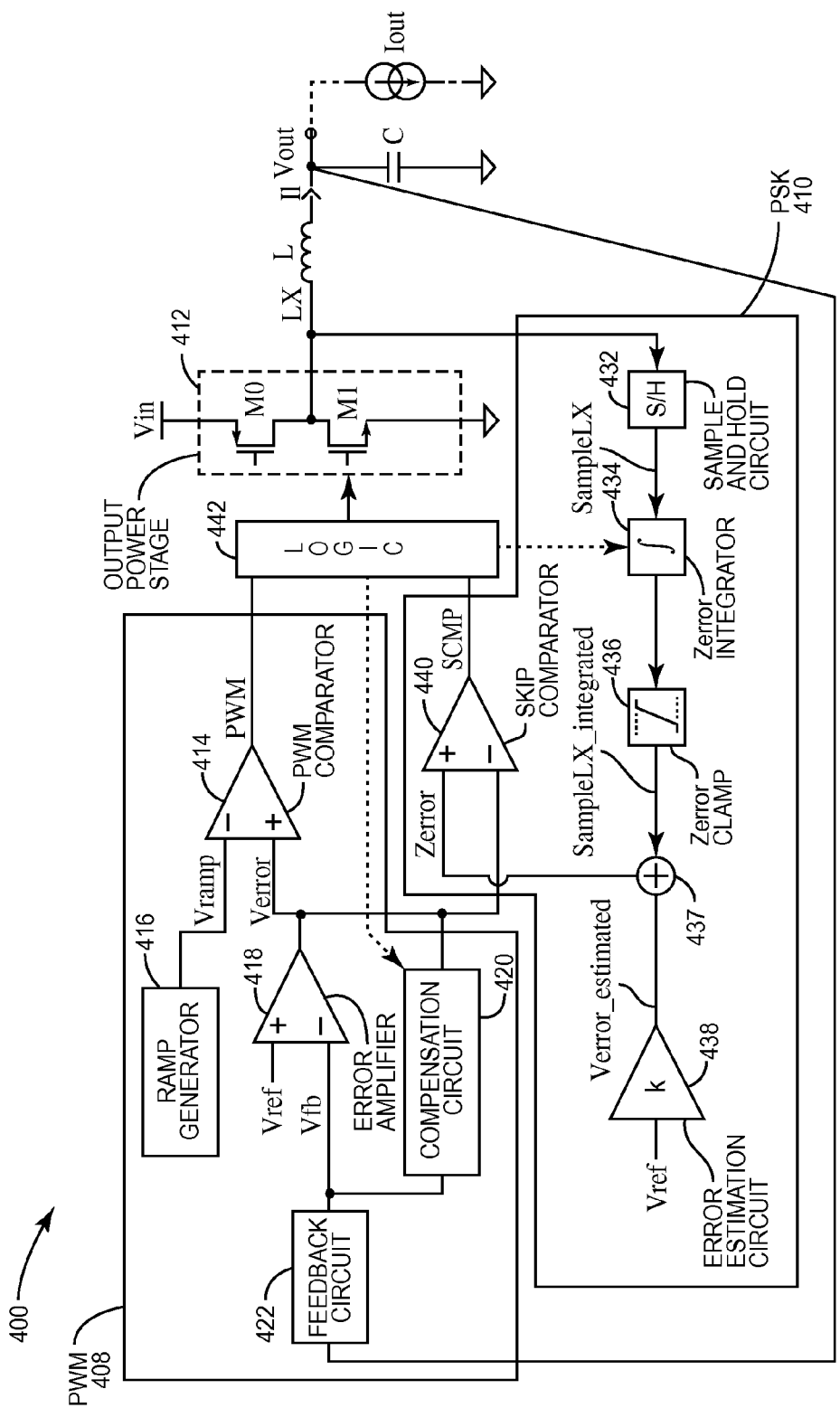
FIG. 8 is a functional schematic diagram of a DC-DC converter having automatic switching between Continuous and Discontinuous Conduction modes without output voltage overshoot or undershoot.

FIG. 8 depicts the structure of a DC-DC buck converter 400 featuring automatic mode switching between PWM (CCM) and PSK/PFM (DCM) modes. The DC-DC converter 400 provides transitions between modes with the minimum possible disturbances (undershoot or overshoot) on the output voltage, determines pulse sizing and pulse skipping in the low power modes, and does not require high speed current sensing.

The DC-DC converter 400 includes a PWM block 408, as described above, to generate a PWM control signal. In addition, a PSK block 410 includes a sample & hold function 432 to sample the value of the LX voltage at the end of M1 conduction (representing the inductor current Il); an integration circuit 434 integrating the S&H output; a clamping function 436 limiting the dynamic range of the integrated signal; an error estimator 438 generating a voltage level close to the theoretical value of the Verror signal; and a summer 437 adding the clamped, integrated, sampled Il current SampleLX_integrated and the estimated error Verror_estimated to generate a Zerror signal. The DC-DC converter 400 also includes a skip comparator 440, which implements skipping decision and pulse sizing functions by comparing the Verror and the Zerror signals, outputting a SCMP signal. Finally, logic circuits 442 decide whether the power stage 412 should turn on M0 or M1, or turn both switches off, based on the outputs of the PWM and SCMP signals, and outputs pulses to the power stage 412 accordingly.

As used herein, in the context of a DC-DC converter 400, a "control pulse," or simply "pulse," refers to one or more signals generated by the logic block 442 which are operative to successively, and in the alternative, turn on (i.e., render conductive) first M0 and then M1 for brief durations during a period, or cycle, of a periodic signal. The relative duration of the M0 and M1 conduction times (i.e., duty cycle) may vary, although the pulse period is generally fixed. In FPWM (CCM) mode, a continuous succession of pulses is generated. In contrast, in PSK (DCM) mode, one or more pulses are conditionally generated; between pulses, the power stage 412 is placed in high impedance by turning both M0 and M1 off (i.e., rendering them nonconductive).

The PSK block 410 generates an estimate of the value of the Verror signal, as a floor for the Zerror signal. In FPWM operation, the duty cycle can be approximated by Vout=Duty*Vin. The PWM comparator 414 generates a PWM signal from the error and ramp signals, the duty cycle of which is Duty=Verror/Vramp. Thus, when the power stage 412 is driven by the PWM signal, Duty=Vout/Vin=Verror/Vramp. The ramp generator 416 generates a signal with an amplitude that is proportional to the Vin level: Vramp=k1*Vin. In regulation, the error amplifier 418 ensures that Vout=k2*Vref, where k2 is the inverse of the gain of the feedback network 420, 422. Using these two properties, then, Verror=k1*k2*Vref. Or, setting k=k1*k2, Verror=k*Vref. Thus, setting Verror_estimated=k*Vref generates a voltage level which is an approximation to the Verror voltage. The value of the constant k may be determined analytically or empirically for any particular implementation.

To account for the inaccuracies of different components, Verror_estimated should always remain below the actual error. In one embodiment, this is done by subtracting a ΔEstim quantity from the theoretical value. Accordingly, the estimated error is set to Verror_estimated=k*Vref−ΔEstim (not shown in FIG. 8).

Figure 9:
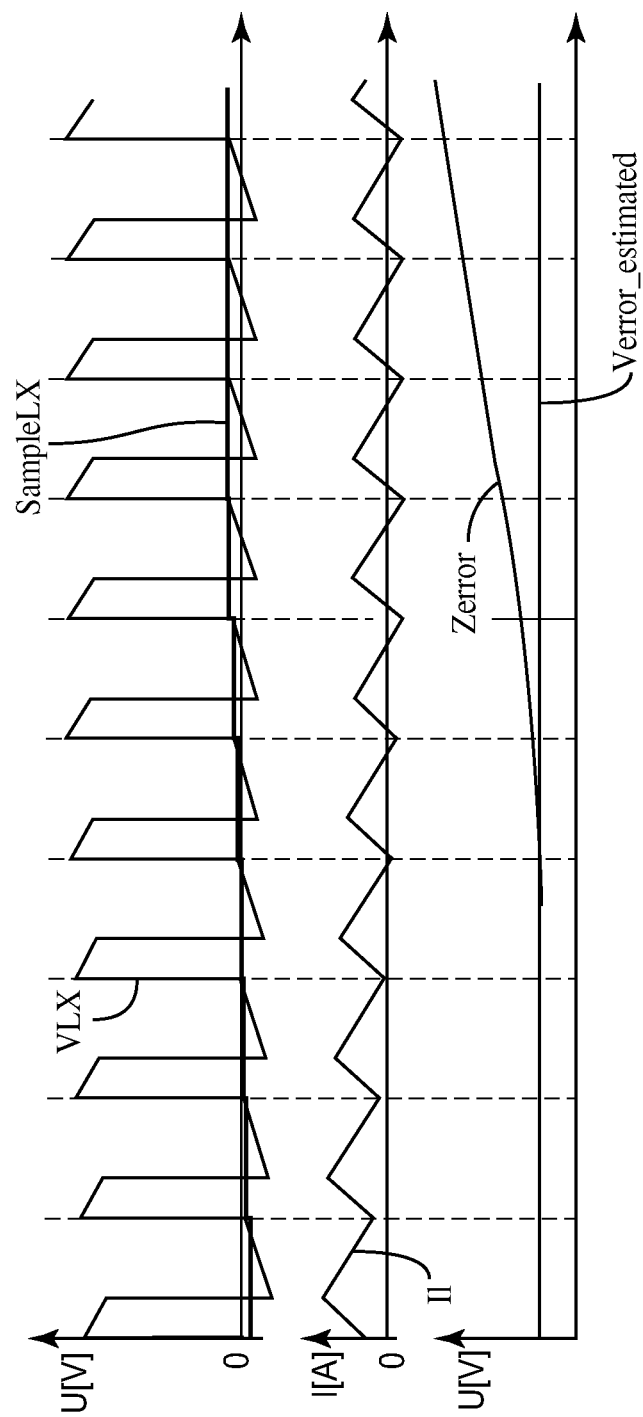
FIG. 9 is a signal diagram of the operation of the DC-DC converter of FIG. 8.

Generation of the Zerror signal is described with reference to the circuit of FIG. 8 and the timing diagram of FIG. 9. The Zerror signal carries analog information representing the clamped integration of the sampled inductor current Il, added to the estimated value of the output voltage error (deviation from reference voltage).

The sample and hold circuit 432 samples the LX node at the end of M1 conduction (i.e., at the end of each pulse). This voltage is an inverse image of the current flowing in the inductor L. The sampled voltage, SampleLX, changes in a step-wise manner at each sampling point (indicated by dashed vertical lines). SampleLX is then integrated by the Zerror integrator 434, and its dynamic range is limited by a clamping circuit 436. The Zerror clamp 436 limits the signal SampleLX_integrated to positive values. Zerror is formed by the summation of SampleLX_integrated and Verror_estimated by the summing circuit 437.

The transistor switches M0 and M1 have a low, but non-zero, resistance when conducting, denoted Ron. Thus when the inductor current Il passes through the switch M1, it creates a voltage drop of Il*Ron. When M1 is conducting and Il is positive (using the convention depicted in the drawings, where positive current Il is in a direction from the DC-DC converter 400 to the load), the LX node voltage is negative. For a given period, the minimum inductor current Il occurs at the end of each pulse; that is, at the transition between M1 on and M0 on (marked by vertical dashed lines in FIG. 9). The LX voltage is sampled at this transition each period. The sampled voltage, SampleLX is thus an inverse image of the lowest inductor current Il. That is, if min[Il]>0, SampleLX<0, and vice versa.

The SampleLX voltage signal is integrated by the Zerror integrator 434. The integrated signal drifts down if the minimum of Il is positive, and drifts up if the minimum of Il is negative. Since the output of the integrator 434 is limited to positive values by the clamping circuit 436, SampleLX_integrated cannot go below 0. In summary, SampleLX_integrated voltage rises when the inductor current Il reverses. The Zerror signal is generated by summing Zerror_integrated and Verror_estimated at the summer 437.

The Zerror signal has the following properties:
Zerror>=Verror_estimated;
Zerror follows the Verror voltage if there is a change in the reference Vref, due to Verror_estimated;
Zerror, if previously at its low limit Verror_estimated, must rise by the same amount ΔEstim to reach the Verror level, when the inductor current Il is negative, regardless of the reference value Vref;
Zerror increases if the minimum inductor current Il reverses; and
Zerror falls to Verror_estimated if the minimum inductor current Il is positive.

The Zerror signal thus effectively detects reversal of the current in the inductor L, and a sustained negative current, without the need for high speed circuits (e.g., using only a sample & hold 432 and an analog integrator 434). These characteristics are evident in the signal diagram of FIG. 9. The voltage LX is sampled at the minimum inductor current Il, which occurs as M1 switches off and M0 switches on (marked by vertical dashed lines on the Il plot). Initially, the SampleLX voltage is less than 0, as the minimum Il current is greater than zero. As the minimum Il current begins to dip below 0 at the sampling points (current reversal), the voltage increases to a positive value. In response, the integrated, clamped, offset signal Zerror begins to rise from its minimum value equal to Verror_estimated, and continues to rise as long as Il<0 at the sample point.

Figure 10:
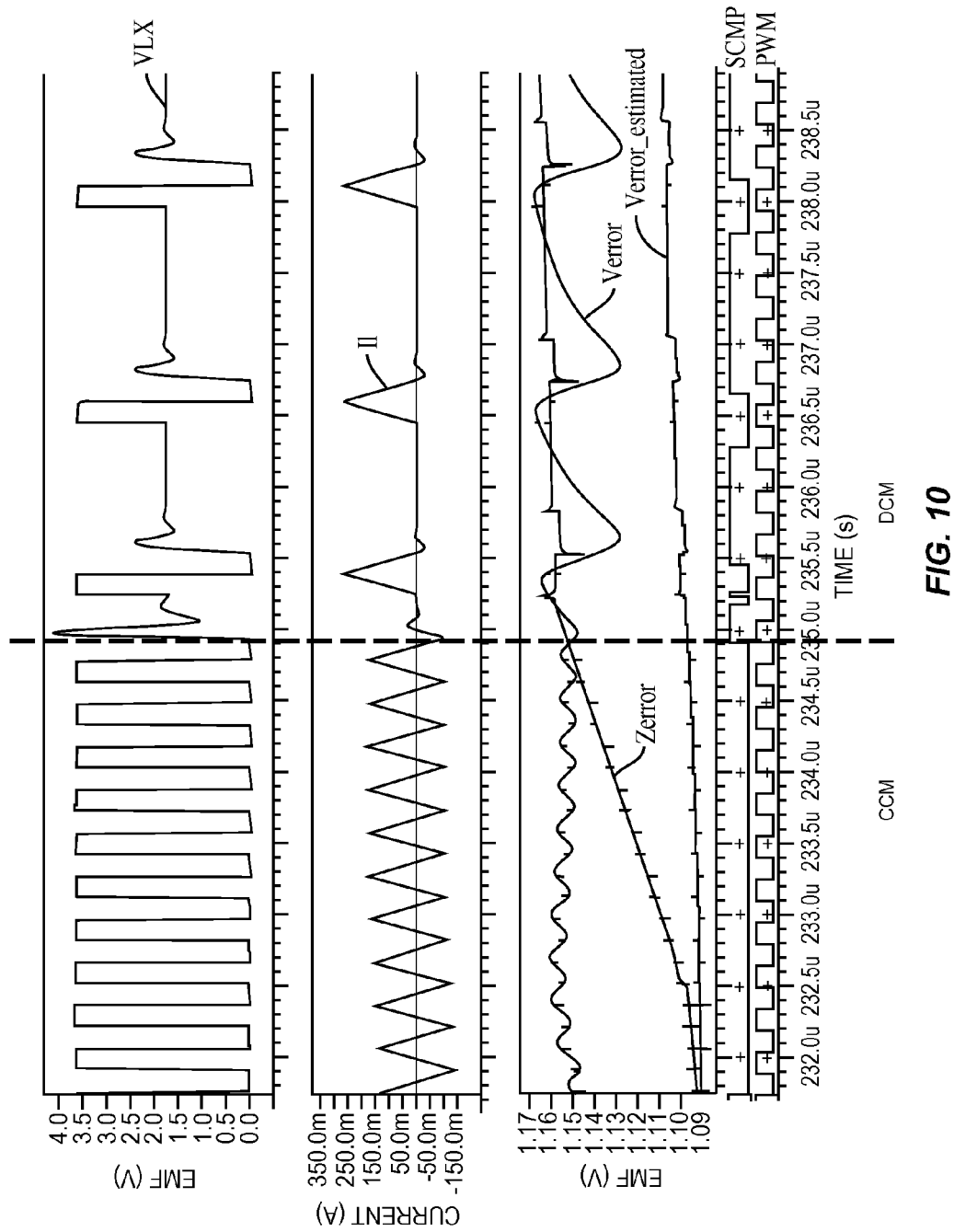
FIG. 10 is a signal diagram of the operation of the DC-DC converter of FIG. 8.
Figure 11:
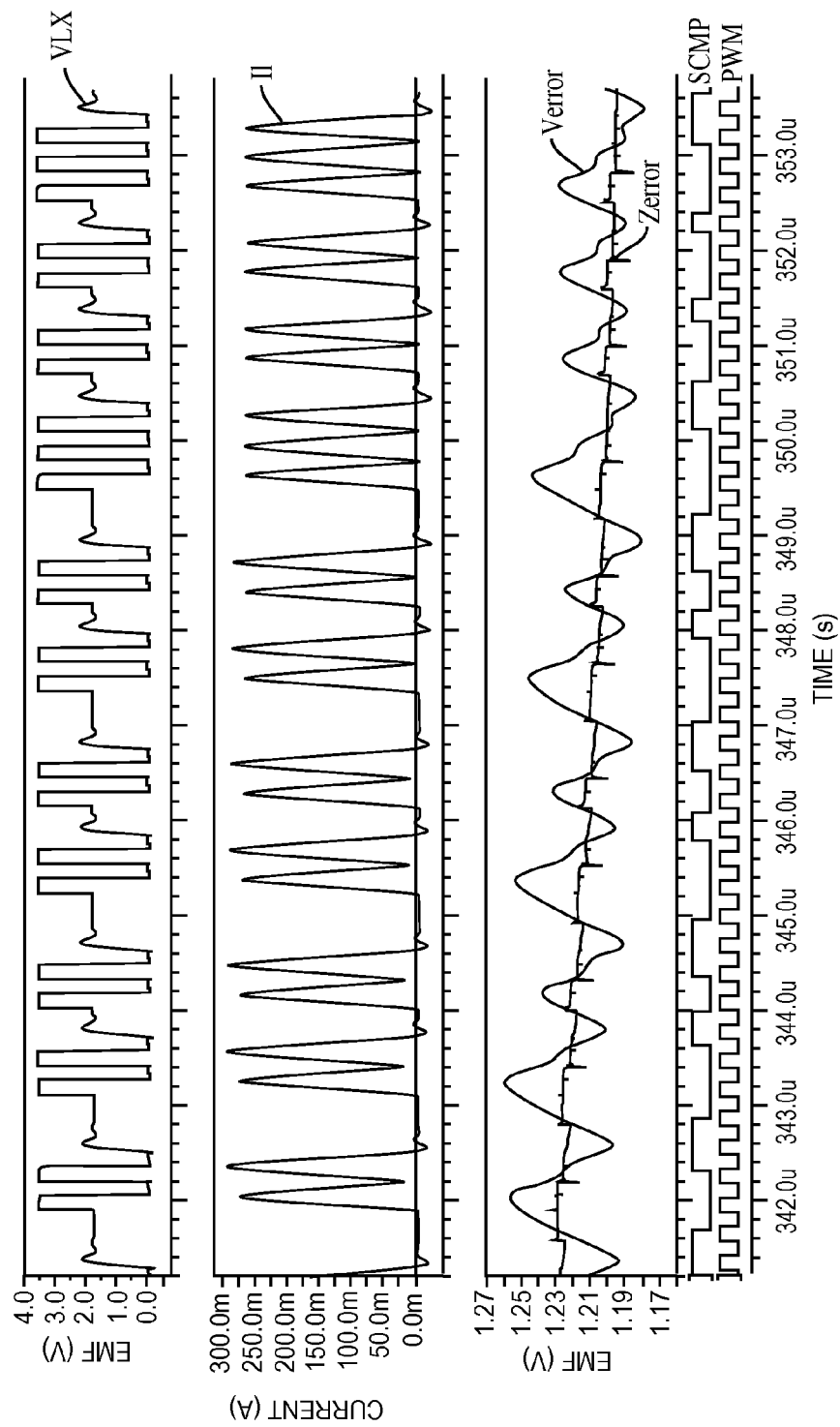
FIG. 11 is a signal diagram of the operation of the DC-DC converter of FIG. 8.

FIG. 8 also depicts the pulse sizing and skipping circuit 440, the operation of which is depicted in the timing diagrams of FIGS. 10 and 11. The skip comparator 440 compares the output of the error amplifier, Verror, and the Zerror signals. The resulting binary logical signal SCMP is output to the logic block 442 which makes the decision whether to initiate a pulse or to place the power stage 412 in a high impedance state.

In one embodiment, the logic block 442 also provides control signals to block integration of the Zerror signal and to reset the integrator 436, as well as controlling the dynamic response of the compensation circuit 420 during operation in PSK mode, as indicated in FIG. 8 by dashed lines.

As described above, if the load draws little current, and the minimum inductor current Il reverses, the Zerror signal rises. As seen in FIG. 10, it will eventually rise to the point where it crosses Verror, such as at 234.9 usec. This causes SCMP to switch to a logical 1. The logic block 442 will then skip the following power stage control pulse if SCMP=1 when the PWM signal transitions from 0 to 1. If a pulse is skipped, the power stage 412 is set to high impedance, with both transistors M0 and M1 off. In this state, no energy is transferred to the output, and the output voltage drops due to the load current. This causes Verror to rise, crossing Zerror and setting SCMP=0. If SCMP=0 when the PWM signal transitions from 0 to 1, i.e. at 235.2 usec, the power stage 412 is removed from high impedance and a control pulse is driven to the power stage 412 according to the PWM signal. The switching on of M0 transfers power to the output, raising the output voltage and lowering Verror below Zerror (i.e., at 235.5 usec), which again drives SCMP to 1, placing the power stage 412 in high impedance. As the output voltage decreases due to no energy transfer, Verror increases, again crossing Zerror at 236.3 usec, initiating another power stage 412 pulse. When Verror is oscillating above and below Zerror in this manner, the DC-DC converter 400 is operating in PSK (DCM) mode.

When the load current increases sufficiently to prevent the minimum inductor current Il from reversing if a pulse is sent to the power stage 412 every period, Zerror will decrease and remain below Verror. This drives SCMP to 0, and the DC-DC converter 300 stops skipping pulses and seamlessly transitions to FPWM (CCM) mode, in which control pulses are issued in a continuous succession. The transition between FPWM and PSK modes of operation is thus achieved with no significant output voltage overshoot or undershoot.

The PSK block 410 also ensures that in PSK (DCM) mode of operation, the conduction duration of M0 and M1 are such that at the end of each pulse (either M1 on to M0 on, or M1 on to HIZ), the inductor current Il is 0. This feature, referred to herein as pulse sizing, is illustrated in FIG. 11.

If the M0 conduction time is too long, the falling phase of the current does not compensate the rising phase, and the current Il at the end of the M1 conduction will be above 0, as illustrated in FIG. 11 for the series of pulses at the left. This causes SampleLX to be set at a negative value, which, after integration, will lead Zerror to decrease. Since the Verror signal must oscillate around Zerror to alternate the pulse skipping and non-skipping of PSK (DCM) mode, Verror is pulled down as well. This results in a smaller duty cycle of the PWM signal, and thus a shorter conduction time of M0.

If the M0 conduction time is too short, the opposite mechanism occurs: Il is below 0 at the end of M1 conduction, causing a positive value of SampleLX. Integration of this signal leads to an increase in Zerror; Verror also increases in order to be able to issue a pulse, and thus the PWM duty cycle increases. This process stabilizes when the inductor current Il=0 at the end of the M1 conduction time, as observed in response to the pulses to the right in FIG. 11.

As a result of the pulse sizing function, the inductor current Il=0 at the end of the M1 conduction time. Since Il is neither positive nor negative, integration of the SampleLX value of 0 results in a steady-state value of Zerror, where it should be in CCM operation. As the load current increases, pulling the output voltage lower and driving Verror higher, Verror will remain above Zerror, and the DC-DC converter 400 seamlessly transitions to FPWM (CCM) mode—again, with no overshoot or undershoot of the output voltage.

Figure 12:
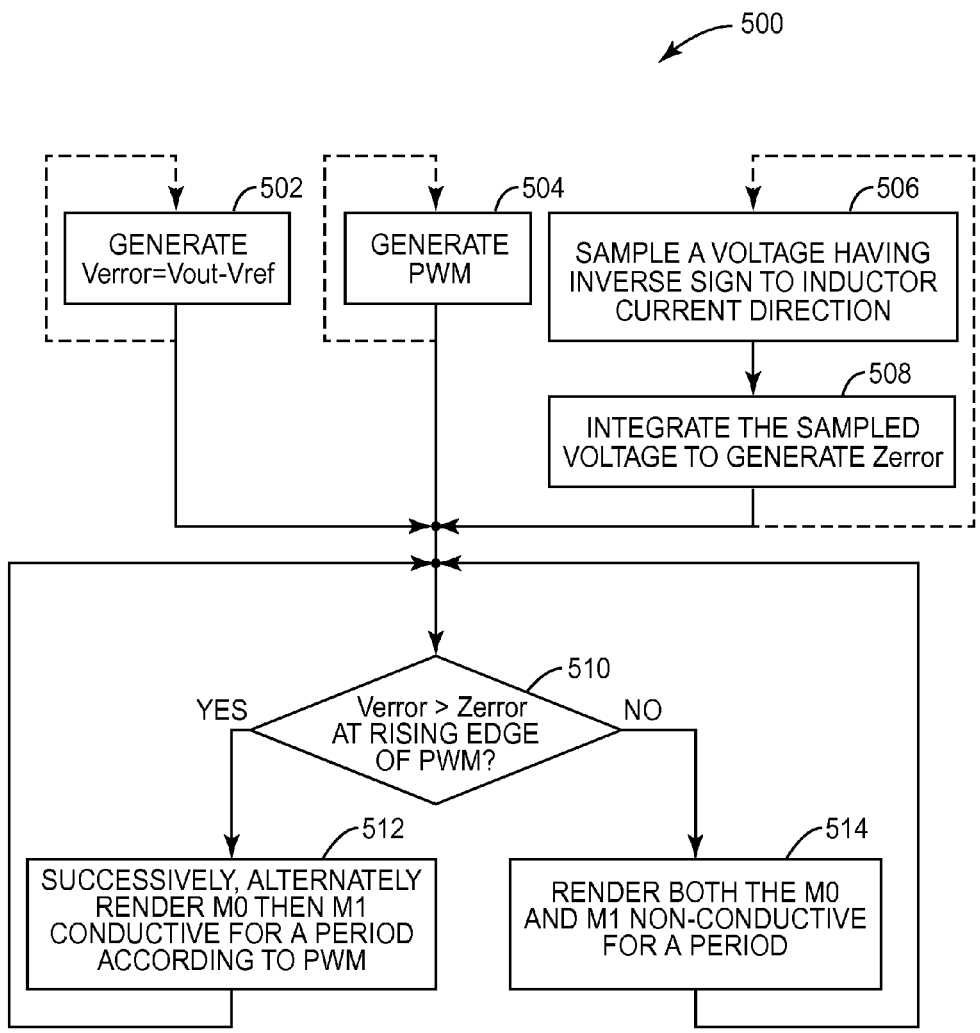
FIG. 12 is a flow diagram of a method of operating the DC-DC converter of FIG. 8.

FIG. 12 depicts a method 500 of operating a DC-DC converter 400, such as the one depicted in FIG. 8. Although depicted in the form of a flow diagram, those of skill in the art will readily recognize that some method steps are continuous and ongoing, and that others are periodic and ongoing. Blocks 502, 504, 506, and 508 indicate this by the dashed-line repetition loops. One such ongoing activity is the generation of an error voltage signal Verror (block 502), which represents the difference between the output voltage Vout and a reference voltage Vref. Another ongoing activity is the generation of a periodic Pulse Width Modulation signal PWM (block 504). PWM is generated by comparing Verror to a periodic ramp signal Vramp having a slope, such as a triangular or sawtooth waveform. The periodic signal PWM defines a succession of periods, or cycles. The duty cycle of PWM controls the relative conduction duration of power stage transistors M0 and M1, when the transistors are enabled (rendered conductive) during a period.

Still another ongoing activity is the periodic sampling of the voltage at the LX node between M0 and M1 (block 506). This voltage, the sign of which is inverse to the direction of inductor current Il, is sampled at the end of each period, when the inductor current Il is at a minimum. The sampled voltage is integrated (block 508)—and in some embodiments may additionally be clamped to a positive value, and offset by an estimate of Verror—to generate the signal Zerror.

Verror and Zerror are compared (block 510), and at the beginning of each period, i.e., at the rising edge of PWM, a decision is taken whether to generate a control pulse to the power stage 412. That is, a decision is taken whether to render the power stage transistors M0 and M1 conductive during the period. If Verror>Zerror at the rising edge of PWM (block 510) then the transistors are successively, alternately rendered conductive (block 512). First, the transistor M0 is rendered conductive to connect the inductor L to the first source voltage level, such as a battery voltage. Subsequently, and alternatively, the transistor M1 is rendered conductive to connect the inductor L to the second source voltage level, such as ground. The transistors M0 and M1 are never rendered conductive simultaneously. The relative durations of conduction of the transistors M0 and M1 are determined by the duty cycle of the PWM signal.

If Zerror>Verror at the rising edge of PWM (block 510) then the power stage 412 is placed in a high impedance state (block 514). That is, both of the transistors M0 and M1 are rendered non-conductive for the duration of the period.

When the method 500 cycles repeatedly between blocks 510 and 512 because Zerror<<Verror, control pulses are issued to render the power stage 412 transistors M0 and M1 conductive during successive PWM periods, and the DC-DC converter 400 is operating in Continuous Conduction Mode (CCM). In CCM power is transferred from the source voltage to the load each period.

When the minimum current Il in the inductor reverses and Zerror>Verror, the method 500 executes block 514 one or more times and the power stage 412 is placed in high impedance state for at least one period. In this case, the DC-DC converter 400 is operating in Discontinuous Conduction Mode (DCM), in which no power is transferred from the source voltage to the load during at least one period. In DCM, the converter 400 transitions between blocks 510 and 514 (i.e., pulse skipping), with an occasional PWM pulse being generated by a transition from block 510 to block 512. As indicated in block 510, the decision whether to issue a PWM pulse or not is based on whether Verror>Zerror. Assuming a steady-state condition in which the minimum current Il (at the end of a pulse) is zero, Zerror does not move, and it is changes in Verror that controls whether PWM pulses are issued or skipped. Since Verror is driven by Vref−Vout, it is the value of Vout relative to Vref that controls the generation or skipping of PWM pulses to the power stage 412.

The characterization of CCM or DCM operation is thus an "after the fact" observation—there is no explicit CCM/DCM mode signal, status register bit, or the like. Rather, the control logic 442 determines whether or not to issue control pulses to the power stage 412 on a cycle-by-cycle basis; it does not explicitly switch between CCM and DCM operating modes. Consequently, there are no transient anomalies, such as overshoot or undershoot deviations of the output voltage or current, when transitioning between CCM and DCM "modes." Rather, the output voltage and current are smoothly and automatically regulated to predetermined values (determined by the reference voltage Vref) in response to control signals that are sampled each period. In other words, the granularity of the decision of CCM/DCM operation, from the perspective of the control circuitry, is every cycle.

In addition to achieving smooth regulation of output voltage and current, without overshoot or undershoot deviations, the DC-DC converter 400 employs simple, inexpensive components that are easily integrated on-chip, and that readily scale to high frequencies. For example, the direction of the minimum instantaneous inductor current Il is determined by simple, well-known sample and hold and integrator circuits, without the need for complex, high-speed current measurement circuits.

Although described herein in the context of mobile electronics devices, the invention is not limited to this application. In general, the DC-DC converter 400 described herein is applicable in a wide variety of power supply and regulation applications. Those of skill in the art may readily implement the inventive circuits and features described and claimed herein to a wide array of DC-DC voltage conversion applications, given the teaching of the present disclosure.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A DC-DC converter operative to receive a source DC voltage and provide an output DC voltage to a load, comprising:
a power stage comprising first and second transistors connected in series between a first source voltage level and a second source voltage level;
an inductor connected between a node connecting the first and second transistors and the load and operative to provide an inductor current from the DC-DC converter to the load; and
control logic operative to generate control pulses to the power stage operative to cause the transistors to successively and alternately connect the inductor to the first and second source voltage levels, wherein the controller is further operative to generate a continuous stream of control pulses in a continuous conduction mode and to selectively generate control pulses, with the transistors disconnecting the inductor from both the first and second source voltage levels between control pulses, in a discontinuous conduction mode;
wherein the control logic is operative to switch between continuous and discontinuous conduction modes without causing an overshoot or undershoot deviation in the output voltage by skipping the generation of control pulses in response to detecting reversal of the inductor current;
a pulse width modulation circuit comprising:
a feedback path operative to generate a Verror signal indicative of a difference between the output DC voltage and a reference voltage,
a ramp generation circuit operative to generate a periodic ramp signal having a slope, and
a comparator operative to generate a pulse width modulation signal operative to vary a duty cycle of the control pulses in the continuous conduction mode by comparing the Verror signal and the periodic ramp signal; and
a pulse skipping circuit operative to detect and indicate reversal of the inductor current comprising:
a sample and hold circuit operative to sample a voltage indicative of the inductor current, and to output a sampled current reversal signal having a positive voltage if the inductor current is negative;
an integrator operative to integrate the sampled current reversal signal; and
a comparator operative to generate a pulse skipping signal when the integrated sampled current reversal signal is greater than the Verror signal.

2. The DC-DC converter of claim 1 wherein the voltage sampled by the sample and hold circuit is indicative of the current in the inductor being a minimum inductor current.

3. The DC converter of claim 2 wherein the sample and hold circuit is operative to sample a voltage at an end of a conduction time for the second transistor.

4. The DC-DC converter of claim 1 wherein the pulse skipping circuit further comprises:
an error estimating circuit operative to generate an estimate of Verror;
a clamping circuit operative to restrict the integrated sampled current reversal signal to positive values; and
a summing circuit operative to add the estimate of Verror to the clamped, integrated, sampled current reversal signal to generate a Zerror signal.

5. The DC-DC converter of claim 4 wherein the control logic is operative to switch from continuous to discontinuous conduction mode in response to detecting reversal of the current in the inductor by skipping control pulses when Zerror>Verror at a rising edge of the pulse width modulation signal.

6. The DC-DC converter of claim 5 wherein the control logic is further operative to alter the duty cycle of control pulses in discontinuous conduction mode so as to maintain the sampled current reversal signal at 0V.

7. The DC-DC converter of claim 6 wherein the sample and hold circuit is operative to sample a voltage at an end of a conduction time for the second transistor.

8. The DC-DC converter of claim 4 wherein the control logic is operative to switch from discontinuous to continuous conduction mode in response to detecting a positive current in the inductor by issuing a control pulse when Verror>Zerror at a rising edge of the pulse width modulation signal.

9. The DC-DC converter of claim 1 wherein the sample and hold circuit is operative to sample a voltage indicative of a minimum current in the inductor.

10. The DC-DC converter of claim 1 wherein the first source voltage level is a battery voltage level and the second source voltage level is a battery ground.

11. A method of operating a DC-DC converter comprising a power stage including first and second transistors connected in series between a first source voltage level and a second source voltage level, and an inductor connected between a node connecting the first and second transistors and a load, the method comprising:
  comparing a voltage output to the load to a reference voltage to generate a Verror signal;
  generating a periodic signal having a duty cycle that controls relative conduction durations of the first and second transistors in a first period if they are rendered conductive for the first period;
  sampling a voltage having a sign that is an inverse of a direction of a minimum current through the inductor;
  integrating the sampled voltage and generating a Zerror signal from the integrated sampled voltage;
  successively, alternately rendering the first and then second transistors conductive for a second period according to the duty cycle of the periodic signal, if Verror>Zerror at a beginning of the second period; and
  rendering both the first and second transistors non-conductive for a duration of a third period if Zerror>Verror at a beginning of the third period.

12. The method claim 11 wherein integrating the sampled voltage to generate the Zerror signal comprises:
  generating an estimate of Verror;
  integrating the sampled voltage;
  restricting the integrated sampled voltage to positive values; and
  adding the estimate of Verror to the restricted, integrated, sampled voltage to generate the Zerror signal.

13. The method of claim 11 wherein sampling the voltage comprises sampling the voltage at the node connecting the first and second transistors at an end of each period.

14. The method of claim 11 wherein the DC-DC converter operates in continuous conduction mode (CCM) when the first and second transistors are rendered conductive for immediately successive periods, and wherein the DC-DC converter operates in discontinuous conduction mode (DCM) when the first and second transistors are rendered non-conductive for at least one of the first period, the second period, and the third period prior to a conductive period.

15. A DC-DC converter operative to receive a source voltage and provide an output voltage to a load, comprising:
  a power stage comprising first and second transistors connected in series between a first source voltage level and a second source voltage level;
  an inductor connected between a node connecting the first and second transistors and the load and operative to provide an inductor current from the DC-DC converter to the load;
  control logic operative to generate control pulses to the power stage operative to cause the transistors to successively and alternately connect the inductor to the first and second source voltage levels, wherein the controller is further operative to generate a continuous stream of control pulses in a continuous conduction mode and to selectively generate control pulses, with the transistors disconnecting the inductor from both the first and second source voltage levels between control pulses, in a discontinuous conduction mode;
  wherein the control logic is operative to switch between continuous and discontinuous conduction modes in response to a pulse skipping circuit that is operative to detect and indicate the reversal of the inductor current comprising:
    a sample and hold circuit operative to sample a voltage indicative of the inductor current, and to output a sampled current reversal signal having a positive voltage if the inductor current is negative;
    an integrator operative to integrate the sampled current reversal signal; and
    a comparator operative to generate a pulse skipping signal when the integrated, sampled current reversal signal is greater than a Verror signal indicative of a difference between the output voltage and a reference voltage.

16. The DC-DC converter of claim 15 wherein the voltage sampled by the sample and hold circuit is indicative of the inductor current being a minimum inductor current.

17. The DC converter of claim 15 wherein the sample and hold circuit is operative to sample a voltage at an end of a conduction time for the second transistor.

18. The DC-DC converter of claim 15 wherein pulse skipping circuit further comprises:
  an error estimating circuit operative to generate an estimate of Verror;
  a clamping circuit operative to restrict the integrated sampled current reversal signal to positive values; and
  a summing circuit operative to add the estimate of Verror to the clamped, integrated, sampled current reversal signal to generate a Zerror signal.

19. The DC-DC converter of claim 18 wherein the control logic is operative to switch from discontinuous to continuous conduction mode in response to detecting a positive current in the inductor by issuing a control pulse when Verror>Zerror at a rising edge of the control pulse.

* * * * *